US007570870B2

(12) United States Patent
Ellis (10) Patent No.: US 7,570,870 B2
(45) Date of Patent: Aug. 4, 2009

(54) SYSTEMS AND METHODS FOR RECORDING PROGRAMS OF LESSER INTEREST WHEN CONVENIENT

(75) Inventor: Michael D Ellis, Boulder, CO (US)

(73) Assignee: GuideWorks, LLC, Radnor, PA (US)

( * ) Notice: Subject to any disclaimer, the term of this patent is extended or adjusted under 35 U.S.C. 154(b) by 708 days.

(21) Appl. No.: 11/237,839

(22) Filed: Sep. 27, 2005

(65) Prior Publication Data
US 2007/0071399 A1    Mar. 29, 2007

(51) Int. Cl.
*H04N 5/91* (2006.01)
(52) U.S. Cl. .......................................... 386/83; 386/92
(58) Field of Classification Search .................. 386/83, 386/46, 125, 124, 45, 92
See application file for complete search history.

(56) References Cited

U.S. PATENT DOCUMENTS

| | | | |
|---|---|---|---|
| 6,865,746 | B1 | 3/2005 | Herrington et al. |
| 6,898,762 | B2 | 5/2005 | Ellis et al. |
| 7,017,179 | B1 * | 3/2006 | Asamoto et al. ............ 725/152 |

2002/0174430 A1    11/2002    Ellis et al.

OTHER PUBLICATIONS

U.S. Appl. No. 09/973,976, filed Oct. 9, 2001, Thomas et al.
U.S. Appl. No. 60/456,078, filed Mar. 18, 2003, Baumgartner et al.
U.S. Appl. No. 11/324,192, filed Dec. 29, 2005, Ellis.
Inside I-Guide User's Manual (Aug. 24, 2004).
U.S. Appl. No. 09/157,256, filed Sep. 17, 1998.
U.S. Appl. No. 09/330,792, filed Jun. 11, 1999.
U.S. Appl. No. 09/374,043, filed Aug. 13, 1999.
U.S. Appl. No. 09/451,612, filed Nov. 30, 1999.
U.S. Appl. No. 09/973,976, filed Oct. 9, 2001.
U.S. Appl. No. 10/105,128, filed Feb. 21, 2002.
U.S. Appl. No. 11/324,192, filed Dec. 29, 2005.

* cited by examiner

*Primary Examiner*—Robert Chevalier
(74) *Attorney, Agent, or Firm*—Ropes & Gray LLP; Baaba Andam; Brian E. Mack (57) ABSTRACT

Systems and methods for recording a program are provided. Alternate transmissions of a program with a "when convenient" recording priority may be recorded in whole or in portions whenever recording does not interfere with other uses of the user's equipment. When the recording device is out of space to record programs, recorded programs having a "when convenient" deletion priority may be deleted and scheduled for re-recording at a later time.

12 Claims, 7 Drawing Sheets

SYSTEMS AND METHODS FOR RECORDING PROGRAMS OF LESSER INTEREST WHEN CONVENIENT

BACKGROUND OF THE INVENTION

This invention is related to systems and methods for recording and deleting programs and more particularly, systems and methods for recording and deleting programs that are of lesser importance to the user.

Recording devices, such as digital video recording (DVR) devices, are well known in the art but still have deficiencies. A user of a DVR device may schedule recordings for a number of programs that he or she may not have the same level of interest in. Should a scheduling conflict occur, the user may be forced to choose to record the program or programs he or she is most interested in, and then search for another broadcast of the other program or programs to record. This may be burdensome and complicated, or perhaps just undesirable, for some users.

A user of a DVR device may experience a similar, undesirable experience when, for example, the user tries to record a program and finds that the DVR device has insufficient space remaining. The user is then forced to either cancel the recording, or select and delete one or more recorded programs to make room for the new program. This experience may even be more frustrating if the user's DVR has space available when the user schedules the recording, but does not have enough space when the program is transmitted. In such cases, unless the user fortuitously checked the DVR device and made space before the broadcast time, the requested program may not be recorded. When the user is more interested in the program he or she wanted to record than in programs already recorded, the experience can be quite frustrating.

As yet another example of a potentially undesirable experience, a DVR device may automatically delete programs in order to make room for a new recording. If the DVR deletes a program that the user is more interested in than the program being recorded, such a result may frustrate the user.

Accordingly, it would be desirable to provide systems and methods for recording programs for which a user has lesser interest at a convenient time.

SUMMARY OF THE INVENTION

This and other objects of the present invention are accomplished in accordance with the principles of the present invention by providing an interactive television application coupled with a recording device. The interactive television application automatically designates, or receives a user's designation for, recording priorities for its recordings. Among the priorities is a "when convenient" priority (others may be, for example, "high" and "low"). In some embodiments, the only recording priority option is "when convenient" or not. The "when convenient" priority indicates that no particular transmission of the requested program is preferred for recording, and that a copy of the requested program should be recorded at the first opportunity in which the recording would not conflict with other user requests.

Prior to recording a program, the interactive television application determines whether recording the program will conflict with current, anticipated or scheduled uses of resources in the user's equipment. For example, the interactive television application may determine whether a tuner will be available for the recording, or whether there will be enough space available to record the program. If a conflict exists or will exist, the interactive television application examines the recording priority of the program. If the recording priority is "when convenient," the interactive television application searches for another transmission of the program at a time when there are no conflicts, and schedules that transmission for recording.

It may be that there is no time when a single transmission of a "when convenient" program can be recorded in its entirety without a resource conflict. In this situation, the interactive television application schedules recordings for the portions of the different transmissions of the "when convenient program" that are not conflicted. As each portion is recorded, or after all of the portions are recorded, the interactive television application will stitch the pieces of the program together to produce a complete recording. Alternatively, the interactive television application may leave the portions unstitched, and simply play them back in order when the user requests that the program be played back.

In response to determining that a scheduled recording is not designated "when convenient", the interactive television application determines whether any other scheduled recordings having a "when convenient" priority can be rescheduled. If not, the interactive television application may alert the user that there is an irreconcilable conflict, and request that the user choose between the recordings or automatically choose between the recordings. For example, the interactive television application may automatically cancel a "low priority" recording in favor of a "high priority" recording.

In some embodiments, the interactive television application may automatically designate, or receive a user's designation for, a deletion priority for recorded programs. When a conflict occurs due to a lack of space on the recording device, the interactive television application uses the deletion priority to determine which, if any, program or programs to delete in order to make room for the new recording. The deletion priorities include a "when convenient" priority (which may be the only option in some embodiments). Other priorities may be, for example, "save until I delete," "high," and "low." In response to determining that a recorded program has a "when convenient" deletion priority, the interactive television application deletes the recorded program to make room for the new program if the recorded program can be recorded later when space is available and there are no other conflicts (the interactive television application may use stitching to accomplish re-recording the entire program).

BRIEF DESCRIPTION OF THE DRAWINGS

The above and other features of the present invention, its nature and various advantages will be more apparent upon consideration of the following detailed description, taken in conjunction with the accompanying drawings, and in which.

DETAILED DESCRIPTION

Figure 1:
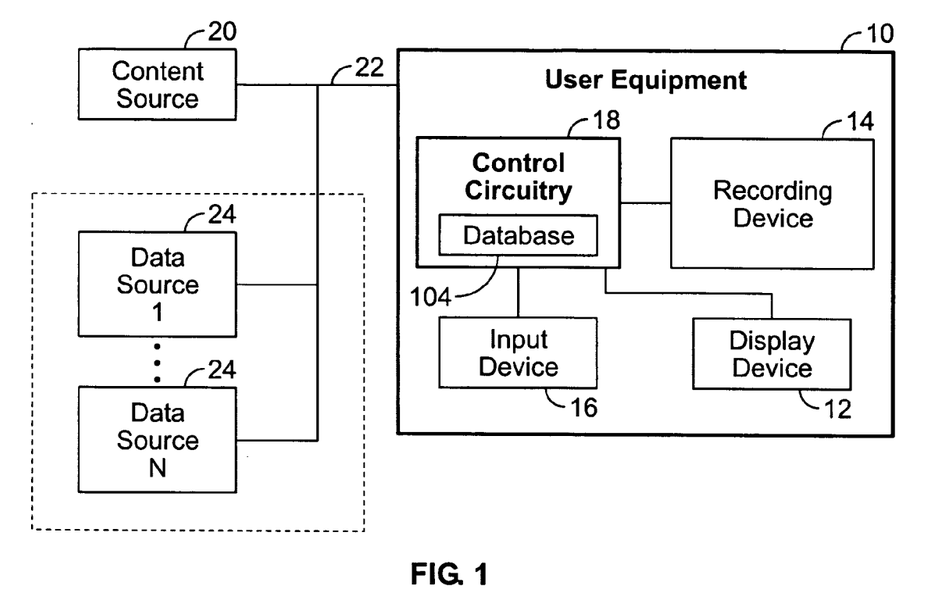
FIG. 1 is a diagram of an illustrative interactive television system in accordance with one embodiment of the present invention.

FIG. 1 shows illustrative interactive television system 1 in accordance with the principles of the invention. User equipment 10 receives content in the form of signals from content source 20 over communications path 22. In practice there may be multiple content sources. For clarity, only one is shown in FIG. 1. Also in practice, there may be multiple instances of user equipment 10 coupled to content source 20 and data source 24. For the clarity of the figure, the user equipment of only a single user is shown.

Content source 20 may be any suitable content source such as, for example, a cable system headend, satellite television distribution facility, television broadcast facility, on-demand server (e.g., video-on-demand (VOD) server), or any other suitable facility or system for originating or distributing content. Content source 20 may be configured to transmit signals over any suitable communications path 22 including, for example, a satellite path, a fiber-optic path, a cable path, or any other suitable wired or wireless path. The signals may carry any suitable content such as, for example, television programs, music, news, web services, or any other suitable content. The signals may be transmitted as a broadcast, multicast, unicast, or any other suitable transmission stream.

User equipment 10 may include any equipment suitable for providing an interactive television experience. For example, user equipment 10 may include computer equipment, such as a personal computer with a television card (PCTV). User equipment 10 may include television equipment such as a television, set-top box, recording device, video player, user input device (e.g., remote control, keyboard, mouse, touch pad, touch screen, voice recognition interface, etc.) or any other device suitable for providing an interactive television experience. For example, user equipment 10 may include a DCT 2000, 2500, 5100, 6208 or 6412 set-top box provided by Motorola, Inc.

In the example of FIG. 1, user equipment 10 includes at least control circuitry 18, display device 12, recording device 14, and user input device 16, which may be implemented as separate devices or as a single device. An interactive television application, such as an interactive television program guide, may be implemented on user equipment 10 to direct a tuner in control circuitry 18 to display, on display device 12, the content transmitted by content source 20 over path 22 and to provide interactive television application features.

Recording device 14 may be a personal video recorder (PVR), digital video recorder (DVR), video cassette recorder (VCR), DVD-recorder, or any other suitable recording device. Recording device 14 may include one or more tuners.

Display device 12 may be any suitable device such as, for example, a television monitor or a computer monitor. Display device 12 may also be configured to provide for the output of audio.

Control circuitry 18 is adapted to receive user inputs from input device 16, execute the instructions of the interactive television application, direct recording device 14 to record programs, and direct display device 12 to display transmitted programs, recorded programs, and interactive television application display screens. Control circuitry 18 may include one or more tuners (e.g., analog or digital tuners), encoders and decoders (e.g., MPEG encoders and decoders), processors (e.g., Motorola 68000 family processors), memory (i.e., RAM and hard disks), communications circuitry (e.g., cable modem circuitry), input/output circuitry (e.g., graphics circuitry), connections to the various devices of user equipment 10 (e.g., recording device 14), and any other suitable component for providing analog or digital television programming, program recording, and interactive television features. In some embodiments, control circuitry 18 may be included as part of one of the devices of user equipment 10 such as, for example, part of recording device 14, display 12, or any other device (e.g., a set-top box, television, video player, etc.).

Control circuitry 18 may include memory for storing interactive television application instructions or other programming logic, and database 104. Database 104 stores interactive television application data from data sources 24 (such as program scheduling data), and other data for use by the interactive television application (e.g., user profiles, recorded program lists, equipment settings, or other suitable information). Database 104 may also store deletion and recording priorities for scheduled and actual recordings. In some embodiments, database 104 is stored in other portions of user equipment 10, such as recording device 14, or may be stored across different devices inside or outside the home.

User equipment 10 may receive interactive television application data from one or more data sources 24. Data sources 24 may provide data for a particular type of content or for a particular application. For example, one data source 24 may provide data for non-on-demand assets (e.g., non-pay and pay-per-view television programs), and another may provide data for on-demand assets (e.g., VOD programs). Or, for example, a single data source may provide both of these types of data. In some embodiments, one data source 24 may provide data for an interactive television program guide, and another may provide data for another interactive television application running on user equipment 10 (e.g., a home shopping application). In some embodiments, data sources 24 may provide data to the interactive television application using a client/server approach. There may be one server per data source, one for all sources or, in some embodiments, a single server may communicate as a proxy between user equipment 10 and various data sources 24.

Content source 20 and data sources 24 are shown in FIG. 1 as separate elements. In practice, their functionality may be combined and provided from a single system at a single facility, or multiple systems at multiple facilities. For example, one content source 20 and data source 24 may be combined to provide VOD content and associated VOD data.

Figure 2:
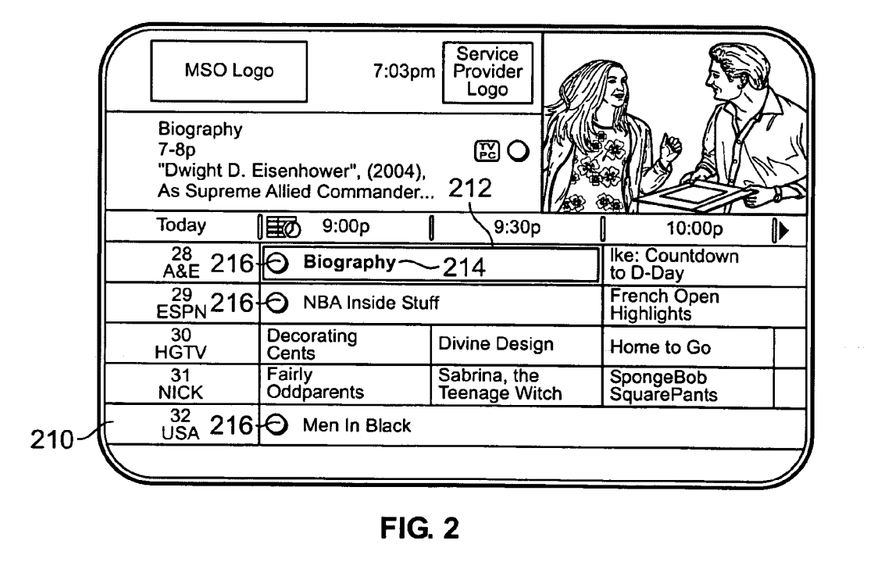
FIG. 2 shows an illustrative display screen showing television program listings in accordance with one embodiment of the present invention.

FIG. 2 shows an illustrative program guide screen 200 that the interactive television application may display on display device 12. The user may access program guide screen 200 by any suitable means such as, for example, pressing a "menu,"

"guide," or other suitable key or key sequence on user input device 16, navigating from another program guide screen or menu, or by any other suitable means. Illustrative program guide screen 200 contains a grid of program listings 210 which includes program titles, channels, scheduled broadcast times, and other suitable program information. In other embodiments, the program guide screen may include a list (i.e., a single column) of programs. The user may select a desired program listing with highlight region 212 using user input 16, or any other suitable means.

To schedule the recording of a program or other suitable video, a user may highlight a desired program (in the example of FIG. 2, listing 214 associated with "Biography" on channel 28 is highlighted), and press a "Record" key or key sequence, or select a "Record" option from the screen using user input device 16. A scheduled recording may be indicated, for example, by record icon 216.

Figure 3:
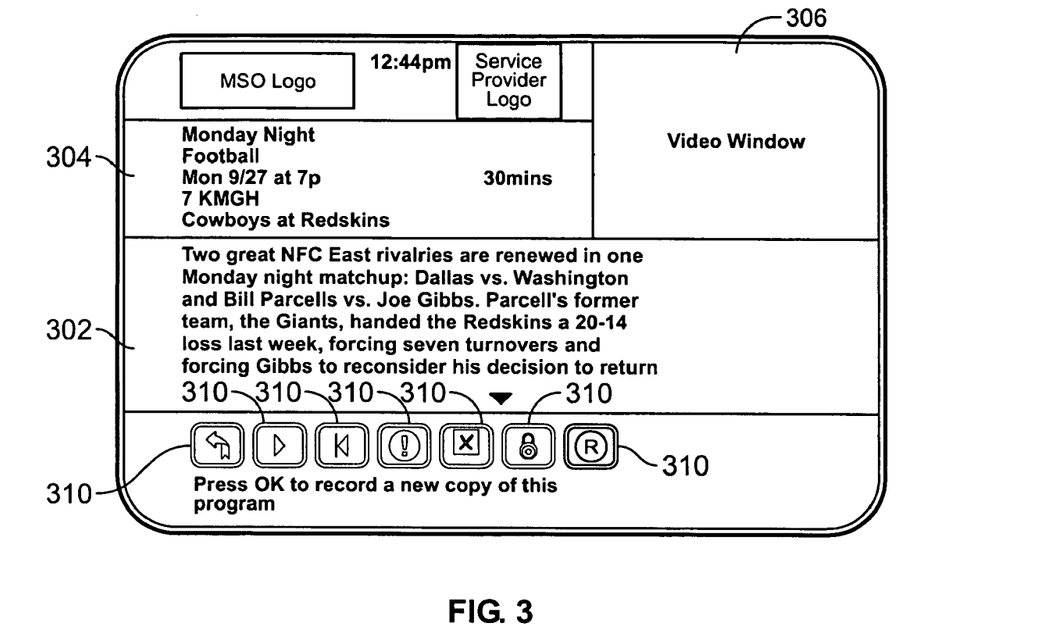
FIG. 3 shows an illustrative display screen showing information relating to a television program in accordance with one embodiment of the present invention.

Prior to choosing to record a program, the user may request additional information regarding the program. For example, the user may highlight a listing using highlight region 212 and press an "Information" key or key sequence on user input device 16. In response to receiving the user request, the interactive television application may display an information screen. FIG. 3 shows illustrative information screen 300, which includes detailed information section 302, program description area 304 (including the program title, time and channel), and video window 306.

Screen 300 also includes selectable icons 310, some or all of which may include text descriptions. The screen may include options for recording, series recording, parental control locks, or any other suitable interactive television application action. If a user decides to record the program, the user may schedule the recording by pressing a "Record" key or key sequence, selecting a "Record" option from the screen using user input device 16, or by any other suitable means.

Figure 4:
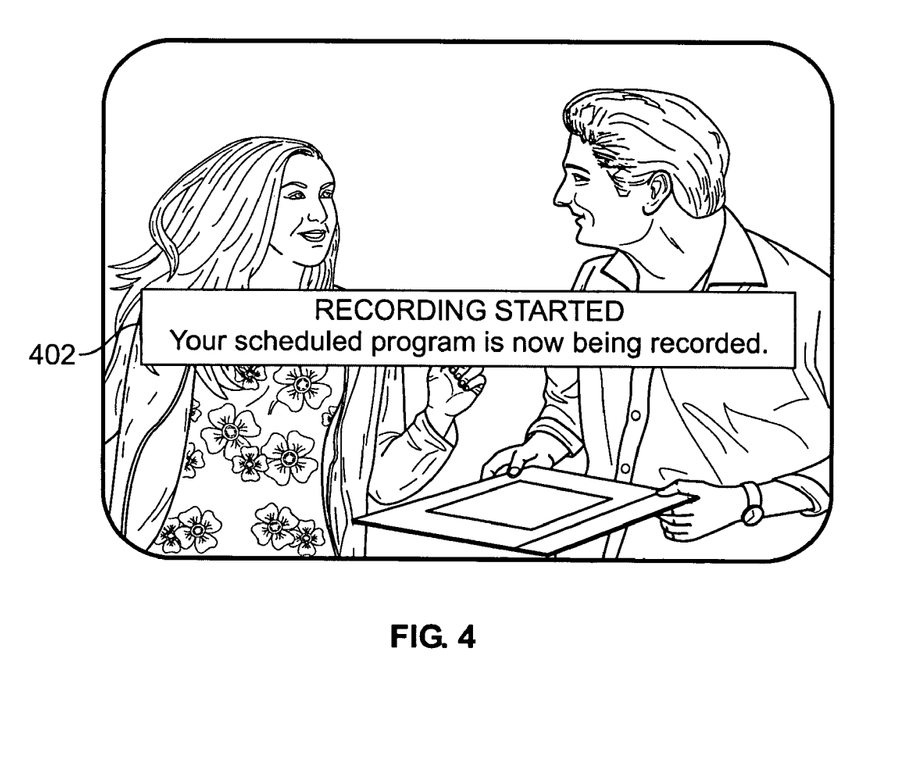
FIG. 4 shows an illustrative display screen showing a television program in full screen after a recording has commenced in accordance with one embodiment of the present invention.

In some embodiments, the user may be watching a program on display device 12 in a full screen view, for example full screen view 400 shown in FIG. 4, and decide to record the program. To record the program being viewed, the user may press a "Record" key or key sequence on user input device 16, or use any other suitable means. A pop-up notice, such as pop-up notice 402, may appear to confirm that recording has begun. The interactive television application may also display the notice in response to receiving a user confirmation to record the program. In some embodiments, the interactive television application may direct pop-up notice 402 to appear automatically when a scheduled recording begins.

In response to receiving a user request to record a program (e.g., from any of screens 200, 300 or 400), the interactive television application automatically designates, or prompts the user to designate, a recording priority for the selected program (e.g., high, low, "when convenient," etc.). The interactive television application may automatically designate a priority for a recording using any suitable approach. For example, if a user pays for viewing or recording a program, it is likely that the user has a high interest in the program and the interactive television application may set its priority as high. As another example, the interactive television application may determine how desirable a program will be to the user based on the user's viewing history. The application may, for example, designate the program high priority in response to determining that the program is of a type that the user is very interested in and very likely to watch. It may designate a program as "when convenient" when it determines, for example, that there are other programs of more interest at the same time that the selected program is transmitted and there are other transmissions of the selected program. As yet another example, the interactive television application may, as a default, set recordings of currently-watched programs to high.

In some embodiments, the interactive television application may attempt to predict when the user is likely to watch recordings and set the recording priority accordingly. This prediction may be based on, for example, the time the user typically waits between recording a program and watching it (a "waiting period"). The waiting period may be determined by the guide or, alternatively, set by the user. The interactive television application may determine waiting periods for different categories or genres of programs to better predict when the user will watch a given recording. In some embodiments, the interactive television application may automatically update recording priorities as time approaches when a user is likely to watch a recording.

The following example will demonstrate how an interactive television application may automatically determine the recording priority for a program in some embodiments of the present invention. Assume the user on Monday selects for recording a Tuesday prime time program every week (such as for a series recording). The interactive television application, based on the user's viewing and usage history, determines that this is a program the user is very interested in, and that the user typically waits until Saturdays to watch this recording. The interactive television application also examines its schedule data and determines that repeats of the program will occur three times before Saturday. After determining that there are no conflicts for any of the transmissions, the interactive television application sets the priority to "when convenient". As the week progresses, the user schedules more recordings, causing resource conflicts for the first and third transmissions. In response, the interactive television application will update the recording priority to high, and schedule the second transmission for recording.

Figure 5:
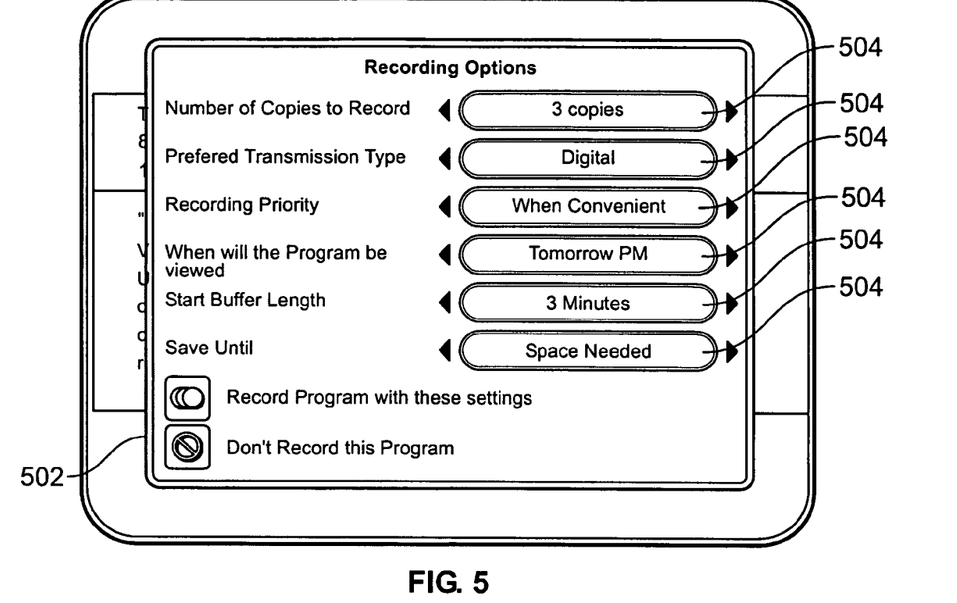
FIG. 5 shows an illustrative display screen showing recording options in accordance with one embodiment of the present invention.

The interactive television application may, instead of or in addition to automatically setting a recording priority for a recording, prompt the user for a priority designation for a recording. For example, the interactive television application may display a screen or pop-up, such as pop-up menu 502 shown in FIG. 5, for the program. Pop-up menu 502 includes a plurality of recording options 504. Recording options 504 include the number of copies to record, which transmissions to record if multiple transmissions are available (e.g., analog, digital, high-definition, etc.), recording priority, when the user intends on viewing the program, start buffer length, and how long to save the copy. These are only illustrative, as any other suitable recording options may also be used. In some embodiments, the recording options pop-up menu may include any other suitable recording option (e.g., resolution, which channel to record, bit rate, recording size, end buffer length, etc.) in addition to or instead of the options shown in FIG. 5. In the example of FIG. 5, the user has set a "when convenient" recording priority for "Biography," the program selected for recording in FIG. 2.

The recording priority (and other recording options), whether set by the user or automatically by the interactive television application, may be stored in a database such as database 104 of FIG. 1. The priority may be represented in database 104 using any suitable approach. For example, the entry may be a simple flag or an alphanumeric value.

Prior to recording a program, the interactive television application determines whether the recording will conflict with current, scheduled or anticipated uses of resources in user equipment 10. For example, the interactive television application may determine whether a tuner in control circuitry 18 or recording device 14 (FIG. 1) will be available for the recording, or whether there will be enough space to record the program on recording device 14. The interactive television application may predict or anticipate uses of resources in user equipment 10 based on, for example, the user's viewing or usage history. Whatever the approach used, the conflict check may occur just before recording the program, at the time the recording is set up, or any time between. In some embodiments, the interactive television application monitors its scheduled recordings for resource conflicts periodically or continuously.

If a conflict exists or will exist, the interactive television application examines the recording priority of the program. If the recording priority is "when convenient", the interactive television application searches its schedule data (such as program guide data received from data source 24 and stored in database 104 of FIG. 1) for alternate (e.g., future) transmissions of the program, and determines whether recording any of the alternate transmissions will cause a resource conflict. If one or more conflict-free transmissions are found, the interactive television application will schedule one of the transmissions (e.g., the next in time transmission) for recording. If there is only one conflict free transmission, the interactive television application may set the recording priority of that transmission to high to ensure that it gets recorded. Alternatively, the priority of the single transmission may remain low. In some examples, no conflict-free transmissions may be available. In this case, the interactive television application may retain the request to record the program in memory, and may continue to search data for upcoming programs as it is received, until the requested program is finally recorded and viewed, or until the user cancels the recording request.

The following example will illustrate how the interactive television application may record a program having a "when convenient" recording priority. In this example, the interactive television application determines whether there is a resource conflict when the user sets the recording. The user decides to record the program "Biography" by selecting the corresponding listing in FIG. 2 (channel 28, 9-10 PM). Upon receiving the selection, the interactive television application may display screen 500 (FIG. 5), which prompts the user to set recording options. In this example, the user sets a "when convenient" recording priority. Upon receiving the recording options set by the user, the interactive television application determines that the user's equipment, which includes two tuners, has no tuners available for the 9:00 PM transmission (two programs are scheduled for recording), but has one tuner available for the 1:00 AM transmission (no recordings scheduled, but the user typically watches a VOD program at that time). In response to the determination, the interactive television application schedules "Biography" for recording at 1:00 AM on channel 28.

In some cases, there may be no time when a single transmission of a "when convenient" program can be recorded in its entirety without a resource conflict. In this situation, the interactive television application schedules recordings for the portions of the different transmissions of the "when convenient program" that are not conflicted. As each portion is recorded, or after all of the portions are recorded, the interactive television application may stitch the pieces of the program together to produce a single complete recording. Alternatively, the interactive television application may leave the portions unstitched, and simply play them back in order when the user requests that the program be played back.

The following example will illustrate this feature. Assume a "when convenient" program has only two transmissions, from 8-10 PM on two successive Fridays. After scheduling the recording of the first transmission, the user schedules two high priority recordings for other programs. The first is for 8-9 PM during the first transmission of the "when convenient" recording. The second is for 9-10 PM during the second transmission of the "when convenient" recording. The second high priority recording was set before the first transmission of the "when convenient" program.

After the user scheduled the first high priority recording, the interactive television application identifies the conflict. It resolves the conflict by identifying the next transmission of the "when convenient" program after the conflict, and scheduling that transmission (the second transmission) for recording. After the user scheduled the second high-priority recording, the interactive television application identifies the conflict. It responds by identifying the next transmission of the "when convenient" program, which is the first transmission that originally had a conflict. After comparing the start and end times of the high priority recordings and determining that the entire "when convenient" program may be recorded, the interactive television application schedules for recording the halves of the "when convenient" transmissions that are not conflicted.

In some embodiments, the interactive television application may systematically record portions of a "when convenient" program when the user's equipment has resources available, even if the interactive television application has not identified alternate transmissions of the program to record to complete the recording (e.g., because there are no known future transmissions, or because the user's equipment's resources are not available at known future transmissions). In such cases, one or more later, as of yet undetermined transmissions may be used to complete the recording.

Figure 6:
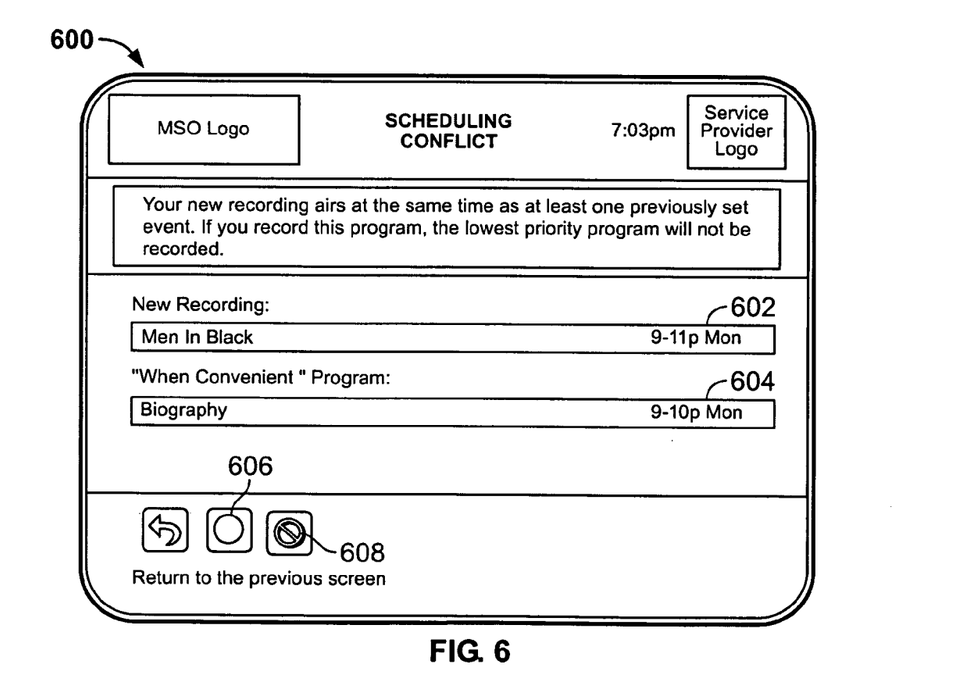
FIG. 6 shows an illustrative display screen showing a scheduling conflict notice in accordance with one embodiment of the present invention.

In some cases, the interactive television application will determine that a schedule conflict is irreconcilable and prompt the user to choose between programs. FIG. 6 shows an illustrative conflict display 600 that the interactive television application may provide when the conflict is a scheduling conflict. A user may select an option (e.g., icon 606) to proceed with the recording of "Men In Black," or select an option (e.g., icon 608) to cancel the recording of "Men In Black" and record "Biography" instead. In some embodiments, schedule conflicts involving "when convenient" programs may not be shown to the user. These conflicts may be resolved automatically by the interactive television application in favor of the higher priority program.

In some cases, a conflict may occur due to a lack of space on the recording device. In such cases, the interactive television application may use a deletion priority to resolve the conflict (e.g., to determine which, if any, program or programs to delete in order to make room for the new recording). In some embodiments, the interactive television application may automatically designate, or receive a user's designation for, a deletion priority for recorded programs. The deletion priorities include a "when convenient" priority (which may be the only option in some embodiments). Other priorities may be, for example, "save until I delete," "high," and "low."

In response to an indication that a program has a "when convenient" or other deletion priority, the interactive television application may change an entry in database 104 (FIG. 1) to reflect the set deletion priority. For example, the interactive television application may change a database entry in database 104 to reflect the deletion priority (e.g., by setting a flag, changing an alphanumeric value in a field, etc.).

The interactive television application may automatically designate the deletion priority for a program using any suitable approach. For example, if a user paid to record a program, it is likely that the user has a high interest in the program and the interactive television application may set its deletion priority as high. As another example, the interactive television application may determine how desirable a program will be to the user based on the user's viewing history. The application may, for example, designate the program high priority in response to determining that the program is of a type that the user is very interested in and very likely to watch. It may designate a program as "when convenient" when it determines, for example, that there are other transmissions of a program during the user's typical waiting period for watching recorded programs generally, or during the user's waiting period for watching recordings of a particular genre. In some embodiments, the interactive television application may designate the deletion priority for recordings that the user has watched as "when convenient." In some embodiments, the interactive television application may automatically set the deletion priority to "when convenient" for any program with a record priority of "when convenient."

The interactive television application may, instead of or in addition to automatically setting a deletion priority for a recording, prompt the user for a deletion priority. For example, the user may highlight a listing within the recordings display of FIG. 8 with highlight region 814 and select "when convenient" priority icon 810. Alternatively, the user may set the deletion priority by selecting an icon or option on a recorded program information screen.

In response to determining that a recorded program has a "when convenient" deletion priority, the interactive television application will delete the recorded program to make room for the new program if the recorded program can be recorded later when space is available (and there are no other conflicts). In some embodiments, the program with the "when convenient" deletion priority may be deleted to make room for a higher priority program regardless of whether a later airing is available to replace it. When a program having a "when convenient" deletion priority is deleted, the interactive television application automatically schedules the program for re-recording if another airing is available. In some embodiments, the scheduled recording may be set with a "when convenient" recording priority. The program may then be re-recorded once space becomes available. In some embodiments, the interactive television application may delete and re-schedule for recording programs that do not have a "when convenient" recording priority, but that the user has already played back.

Figure 7:
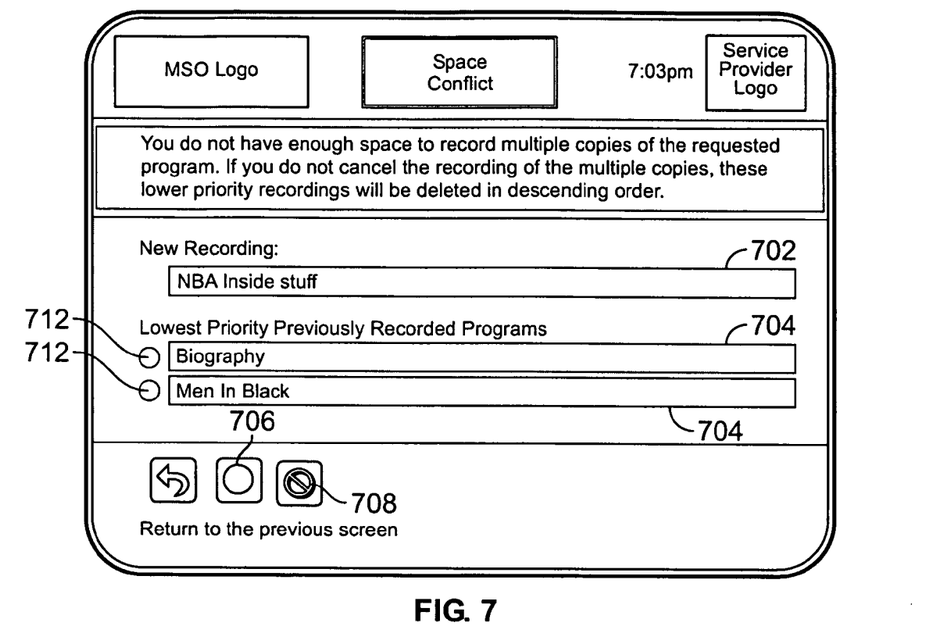
FIG. 7 shows an illustrative display screen showing a recording space conflict notice in accordance with one embodiment of the present invention.

In some instances, the interactive television application may not be able to resolve a storage space conflict. FIG. 7 shows an illustrative display 700 that prompts the user to decide whether a recording should proceed. In this example, the interactive television application has suggested deleting "Biography" and "Men In Black," (listings 704) which were both identified as having "when convenient" deleting priorities to make room for "NBA Inside Stuff" (listing 702). The interactive television application indicates to the users that those two programs have a "when convenient" deletion priority with "when convenient" deletion priority icon 712. The user may select an option (e.g., icon 706) to proceed with the deletion or select an option (e.g., icon 708) to cancel the recording of "NBA Inside Stuff." In some embodiments, the interactive television application may not notify the user or give the user an option when a program with a "when convenient" deletion priority is deleted to make space for a higher priority recording.

Figure 8:
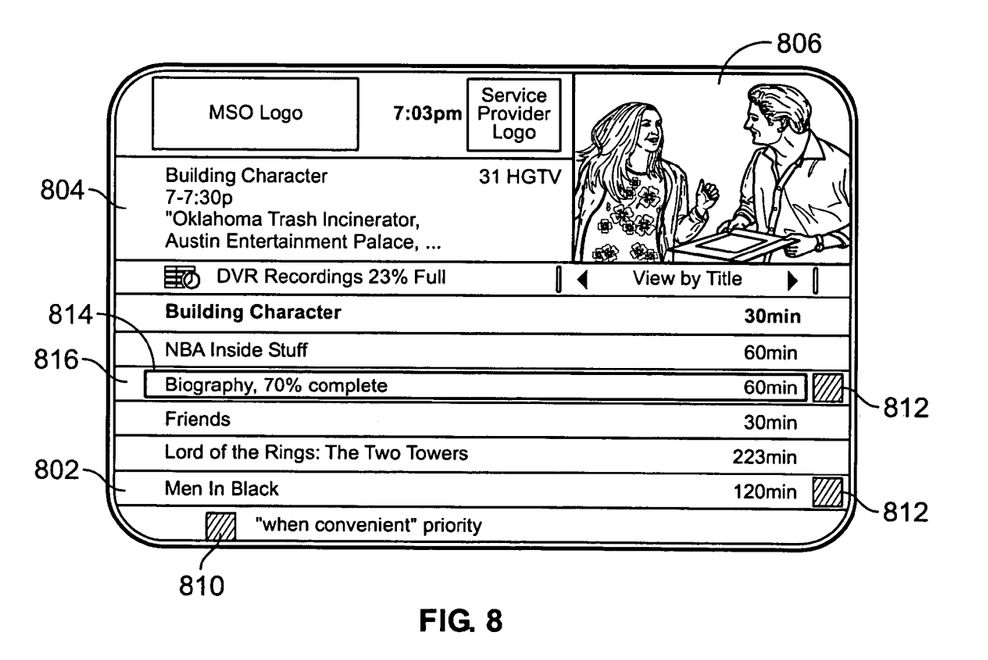
FIG. 8 shows an illustrative display screen showing a list of recorded programs in accordance with one embodiment of the present invention.

Once a program has been recorded, either completely or in part, the user may access a listing display, for example listing display 800 shown in FIG. 8, to view listings of recorded programs. The user may access the listing display by pressing a "Recorded Programs Menu" key or key sequence, navigating from one of the interactive television application screen, or by any other suitable means. Illustrative listing display 800 includes recorded programs listings 802 (with program title and length), program description area 804 and video window 806.

To allow a user to identify programs having a "when convenient" deletion priority in listings displays, the interactive television application may display an icon on the listings associated with the programs, change the color of the listings, or mark the listings in any suitable manner. In the example of FIG. 8, the listings for "Biography," and "Men In Black" are identified as having "when convenient" deleting priorities by icon 812. In some embodiments, the user may delete programs that have been completely or partially recorded from screen 800.

In some embodiments, the recorded programs listings (e.g., listings 802) may include listings for programs that are partially recorded. The partially recorded programs may be made available to the user for viewing. In some embodiments, the listings for incomplete programs may include an indication of the completed amount of the recording. For example, listing 816 indicates that "Biography" is only 70% complete. In some embodiments, the indication may inform the user which portions are available for viewing and/or which portions are not yet recorded. In some embodiments, the interactive television application may provide the expected date and time when the recording of the program will be complete to the user. In some embodiments, only programs that are completely recorded may be included in program listings 802.

Figure 9:
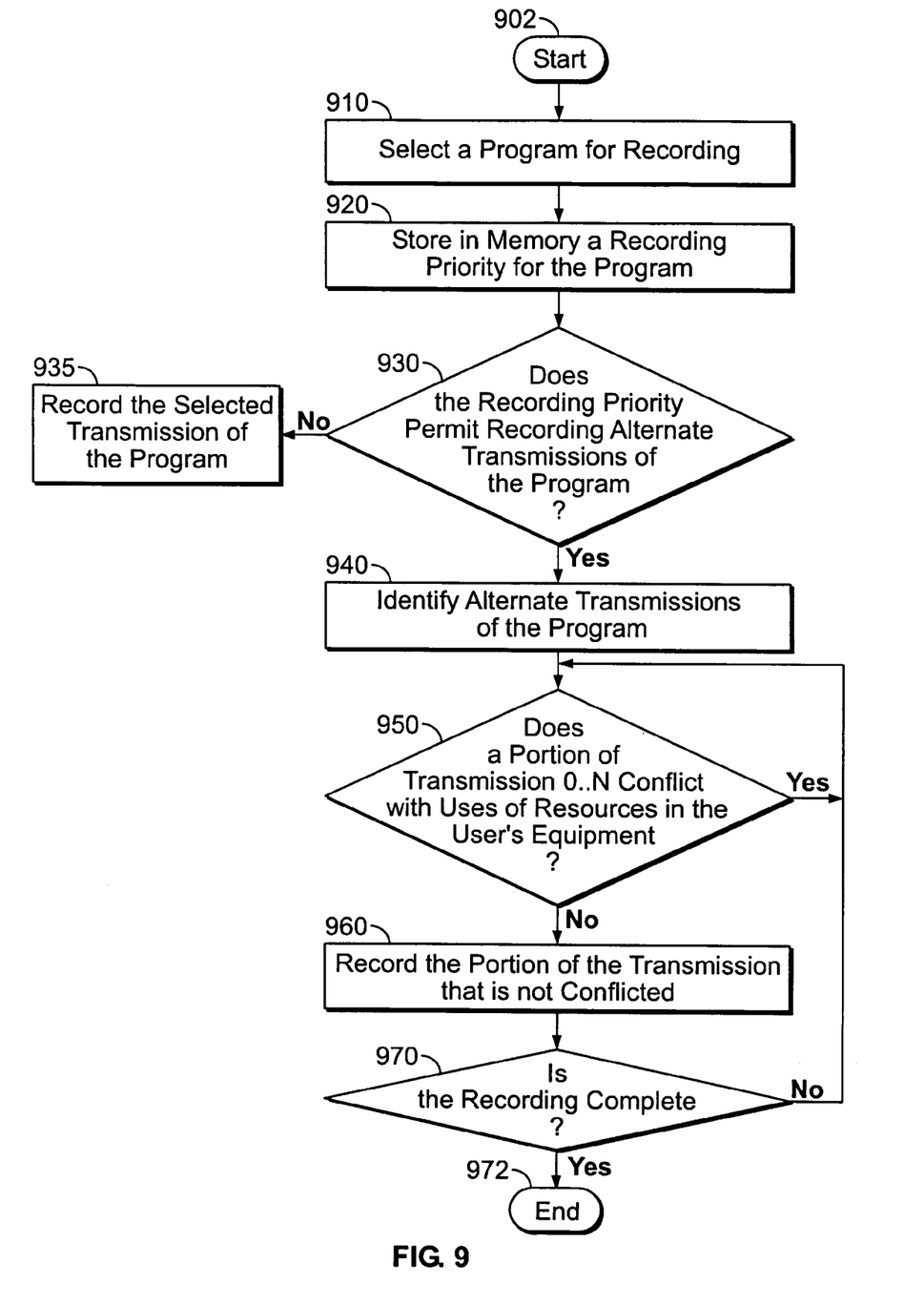
FIG. 9 shows a flow chart of an illustrative process for recording programs having a "when convenient" recording priority in accordance with one embodiment of the present invention.

The following flow charts serve to illustrate processes involved in some embodiments of this invention. FIG. 9 is a flow chart of an illustrative process for recording portions of transmissions of programs having a "when convenient" recording priority in one embodiment of the invention. Process 900 begins at step 902. At step 910, the interactive television application selects a transmission of a program for recording in response to, for example, a user's instruction. In another example, the interactive television application may automatically select a program for recording based on any suitable criteria (e.g., user preferences, series recording, etc.). At step 920, the interactive television application stores in memory a recording priority for the program. For example, the user may have set the recording priority for the program, or the interactive television application may have automatically set the recording priority.

At step 930, the interactive television application determines whether the recording priority of the program permits recording alternate (e.g., future) transmissions of the program instead of the scheduled recording (i.e., whether the priority is "when convenient"). If the interactive television application determines that the recording priority of the program does not permit recording alternate transmissions, process 900 moves to step 935, where the selected transmission is recorded. If instead the interactive television application determines that the recording priority of the program permits recording alternate transmissions, process 900 moves to step 940. Step 930 may be performed conditionally in response to determining that the recording conflicts or will conflict with another use of the resources of the user's equipment (not shown).

At step 940, in response to determining that the recording priority permits recording alternate transmissions instead of the selected one, the interactive television application identifies alternate transmissions of the program. For example, the interactive television application may search the program schedule data provided by data sources 24 for alternate transmission times of the program. At step 950, the interactive television application determines whether portions of each transmission of the program conflict with current, anticipated or scheduled uses of resources in the user's equipment, beginning with either the originally selected transmission or the alternate transmissions. For example, the interactive television application may determine whether programs are scheduled for recording at the same time portions of the original and alternate transmissions, or whether there will not be sufficient space on recording device 14 (FIG. 1) for recording the entireties of an individual transmission when it is transmitted. The interactive television application may check for conflicts any number of times and at any time up to the transmission time of each transmission. If the interactive television application determines that a portion of the alternate transmission is not conflicted, process 900 moves to step 960, where the portion of the alternate transmission of the program that is not conflicted is recorded. If instead the interactive television application determines that the entire alternate transmission is conflicted, process 900 moves back to step 950 to determine whether another transmission conflicts with current, anticipated or scheduled uses of resources in the user's equipment.

At step 970, the interactive television application determines whether the program has been recorded in its entirety by, for example, comparing the portions of the program that were recorded from each transmission and determines whether the combination of the portions provides the user with the entire program. If the interactive television application determines that the recording is incomplete, process 900 moves to step 950 to record additional portions of the program. If instead the interactive television application determines that the recording is complete, process 900 ends at step 972.

Figure 10:
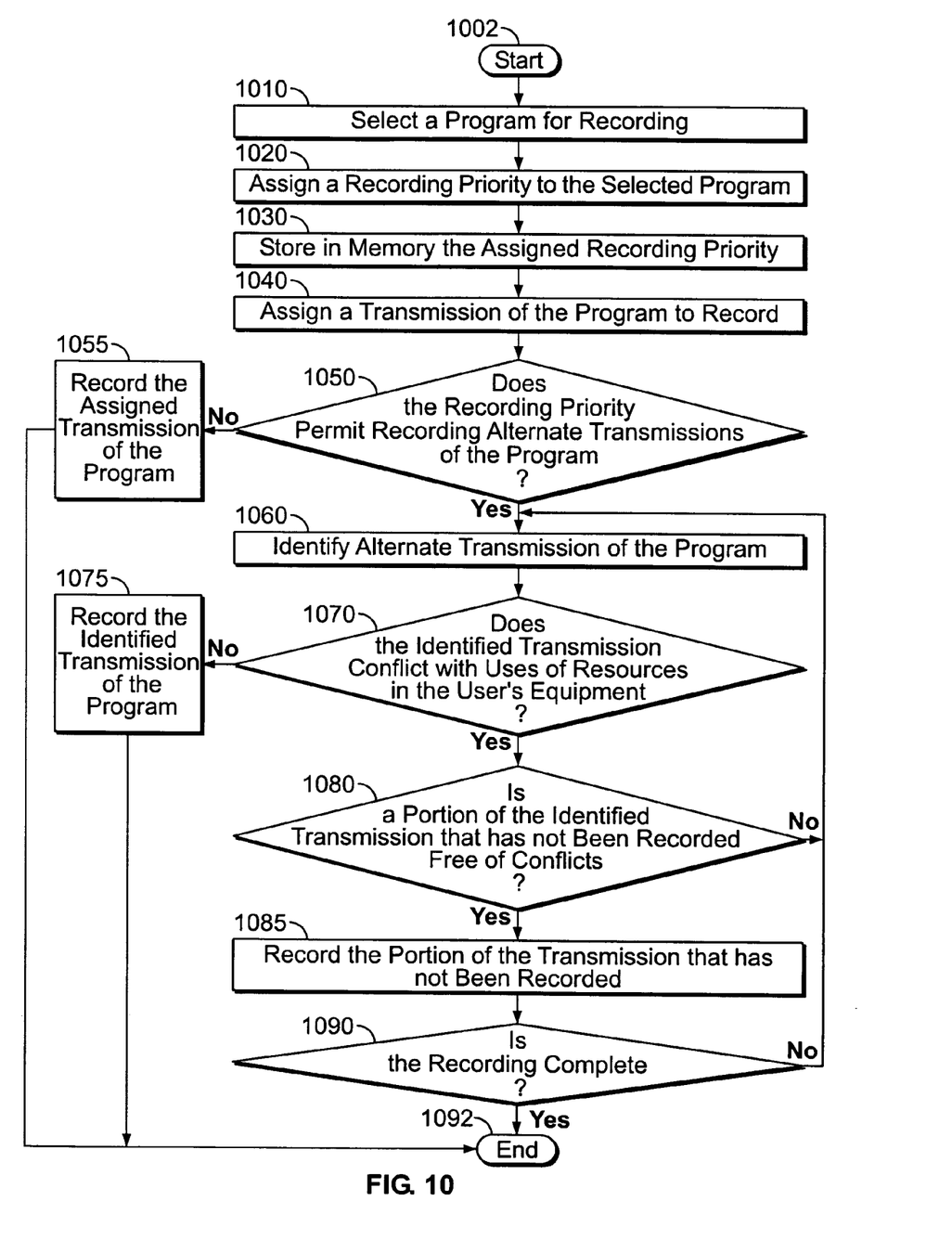
FIG. 10 shows a flow chart of another illustrative process for recording programs having a "when convenient" recording priority in accordance with one embodiment of the present invention.

FIG. 10 is a flow chart of an illustrative process for recording portions of transmissions of programs having a "when convenient" recording priority in one embodiment of the invention. Process 1000 begins at step 1002. At step 1010, the interactive television application selects a program for recording. For example, the user may instruct the interactive television application to select a program for recording, or the interactive television application may automatically select a program for recording (e.g., based on user preferences, series recording). At step 1020, the interactive television application assigns a recording priority to the selected program. For example, the user may instruct the interactive television application to assign a particular recording priority to the program, or the interactive television application may automatically assign a recording priority. At step 1030, the interactive television application stores in memory the recording priority assigned at step 1020.

At step 1040, the interactive television application assigns a particular transmission of the program to record. For example, the interactive television application may assign a transmission selected by the user for recording. In some embodiments, the interactive television application may skip step 1040 (e.g., when the selected program has a "when convenient" recording priority).

At step 1050, the interactive television application determines whether the recording priority of the program permits recording alternate transmissions of the program instead of the scheduled transmission (i.e., whether the priority is "when convenient"). If the interactive television application determines that the recording priority of the program does not permit recording alternate transmissions, process 1000 moves to step 1055, where the user's equipment records the assigned transmission of the program (e.g., assigned at step 1040). Process 1000 then ends at step 1092. If instead the interactive television application determines that the recording priority of the program permits recording alternate transmissions, process 1000 moves to step 1060. Step 1050 may be performed conditionally in response to determining that the recording conflicts or will conflict with another use of the resources of the user's equipment (not shown).

At step 1060, the interactive television application identifies a current or alternate transmission of the program. In some embodiments, the interactive television application may identify transmissions of the program at the time the program is selected for recording, at the time the program is transmitted (or shortly before), or at any time in between. In some embodiments, the interactive television application may identify transmissions at regular intervals.

At step 1070, the interactive television application determines whether the identified transmission of the program conflicts with uses of resources of the user's equipment. For example, the interactive television application may determine whether the user's equipment has an available tuner and enough space to record the identified transmission. If the interactive television application determines that the transmission does not conflict with uses of the user's equipment (e.g., the user's equipment has enough resources available to record the identified transmission), process 1000 moves to step 1075, where the identified transmission is recorded. Process 1000 then ends at step 1092.

If instead the interactive television application determines that the transmission conflicts with uses of the user's equipment (e.g., the user's equipment does not have enough resources available to record the identified transmission), process 1000 moves to step 1080. At step 1080, the interactive television application determines whether a portion of the identified transmission that has not yet been recorded conflicts with other uses of the resources of the user's equipment. For example, the interactive television application may determine whether the user's equipment has a tuner available for recording only a half hour of a two hour program. As another example, the interactive television application may determine whether the user's equipment has enough space to record only 30 minutes of a program. If the interactive television application determines that the portions of the transmission that have not yet been recorded conflict with uses of resources of the user's equipment (e.g., the user's equipment does not have available resources to record the portions of the program that have not yet been recorded), process 1000 moves back to step 1060 where the interactive television application identifies another transmission of the program.

If instead the interactive television application determines that a portion of the transmission that has not yet been recorded does not conflict with uses of resources of the user's equipment (e.g., the user's equipment has available resources to record a portion of the program that has not yet been recorded), process 1000 moves back to step 1085. At step 1085, the interactive television application records the portion of the program that does not conflict with uses of resources of the user's equipment. At step 1090, the interactive television application determines whether the recording of the selected program is complete. If the interactive television application determines that the recording is incomplete, process 1000 moves back to step 1060 where another transmission of the program is selected. If instead the interactive television application determines that the recording is complete, process 1090 ends at step 1092.

Figure 11:
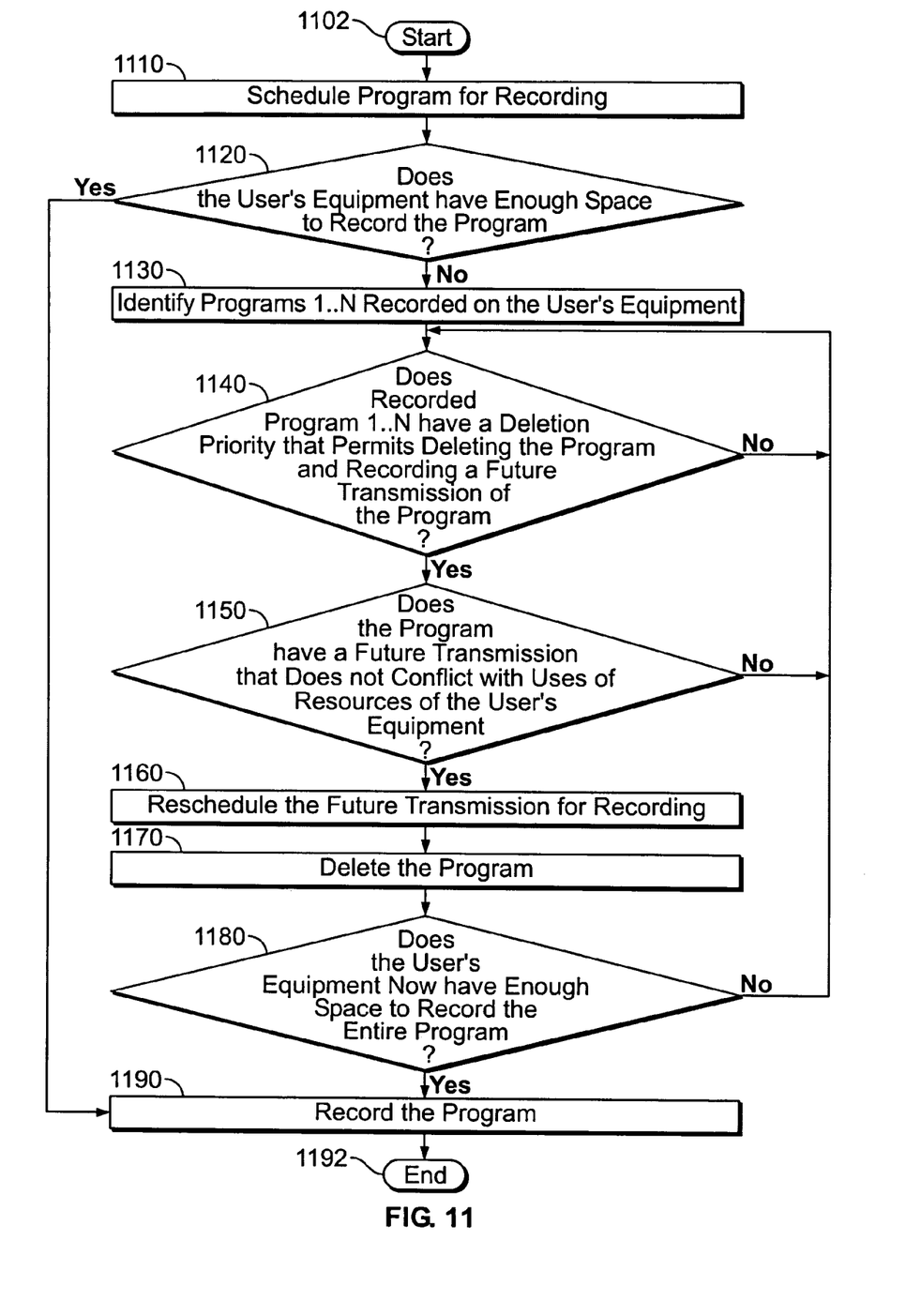
FIG. 11 shows a flow chart of an illustrative process for deleting and scheduling for re-recording programs having a "when convenient" deletion priority in accordance with one embodiment of the present invention.

FIG. 11 is a flow chart of an illustrative process for deleting a program having a "when convenient" deletion priority and recording a future transmission of the deleted program. Process 1100 starts at step 1102. At step 1110, the interactive television application schedules a program for recording in response to, for example, a user's instruction. In another example, the interactive television application may automatically schedule a program for recording based on any suitable criteria (e.g., user preferences, series recording, etc.). At step 1120, the interactive television application determines whether the user's equipment has enough space available to record the program. For example, the interactive television application may determine the space available in recording device 14, and compare the space available to the expected size of the requested program. If the interactive television application determines that the user's equipment has enough space available, process 1100 moves to step 1190 and records the program. If instead the interactive television application determines that the user's equipment does not have enough space available, process 1100 moves to step 1130.

At step 1130, the interactive television application identifies previously recorded programs (or portions of programs) 1 . . . N and, at step 1140, determines whether each of the identified recorded programs or portions of programs has a deletion priority that permits deleting the program and recording a future transmission of the program (i.e., "when convenient" deletion priority). The order in which the programs are checked may be based on any suitable criteria, e.g., priority, date recorded, size, etc. If the interactive television application determines that a program does not have a deletion priority that permits deleting the program and recording a future transmission of the program, process 1100 moves back to step 1140 to determine whether another recorded program has a suitable deletion priority.

If instead the interactive television application determines that a program or a portion of a program has a deletion priority that permits deleting the program and recording a future transmission of the program, process 1100 moves to step 1150. At step 1150, the interactive television application determines whether the program has a future transmission that does not conflict with uses of resources of the user's equipment. For example, the interactive television application may identify future transmissions of the recorded program or a portion of the program and compare them with scheduled and anticipated uses of resources of the user's equipment (e.g., available tuners). If the interactive television application determines that the program does not have a suitable future transmission, process 1100 moves back to step 1140 to determine whether another recorded program has an appropriate deletion priority, as described above.

If instead the interactive television application determines that the recorded program or a potion of the program has a future transmission that does not conflict with uses of resources of the user's equipment, process 1100 moves to step 1160, at which the interactive television application schedules the future transmission for recording. Steps 1150 and 1160 may be optional. The interactive television application may delete the program or portion of the program with the "when convenient" deletion priority, even if no known future transmission can be scheduled for recording. At step 1170, the interactive television application deletes the recorded program or a portion of the program to create space for recording additional programs. At step 1180, the interactive television application determines whether the user's equipment has enough space to record the program in its entirety now that the recorded program has been deleted. If the interactive television application determines that the user equipment has enough space available, process 1100 moves to step 1190 and records the requested program in the available space. If instead the interactive television application determines that the user's equipment does not have enough space, process 1100 moves back to step 1140 to attempt to find another "when convenient" recording for deletion, as described above. Process 1100 ends at step 1192.

In some embodiments, the interactive television application may record only a portion of the requested program in the space made available by the deletion such as when, for example, the program to be recorded has a "when convenient" recording priority. In such embodiments, the interactive television application may use stitching, described above, to play back the program.

The above described embodiments of the present invention are presented for purposes of illustration and not of limitation, and the present invention is limited only by the claims which follow.

What is claimed is:

1. A method for recording a program, comprising:
   storing a recording priority for a selected recording of a program on a recording device;
   determining, using control circuitry, whether the recording priority permits recording an alternate transmission of the program;
   in response to determining that the recording priority permits recording an alternate transmission of the program, identifying. using the control circuitry, alternate transmissions of the program;
   recording a portion of a plurality of transmissions on the recording device to record the entirety of the program, while avoiding resource conflicts; and
   playing back the program on a display device from the portion of each transmission that was recorded so that the entirety of the program is played back.

2. The method of claim 1 wherein playing back the program comprises playing back each recorded portion on the display device sequentially based on the position of each portion within the program.

3. The method of claim 1 further comprising:
   determining, using the control circuitry, for each identified transmission, whether recording a portion of the identified transmission conflicts with uses of a tuner; and
   wherein recording a portion of a plurality of transmissions comprises recording a portion of a plurality of transmissions that does not conflict with uses of a tuner.

4. The method of claim 1 further comprising:
   determining, using the control circuitry, for each identified transmission, whether recording a portion of the identified transmission conflicts with the space available for recording programs; and
   wherein recording a portion of a plurality of transmissions comprises recording a portion of a plurality of transmissions that does not conflict with the space available for recording programs.

5. The method of claim 1 wherein the first recorded portion of the program is from an alternate transmission of the program.

6. The method of claim 1 further comprising:
   determining, using the control circuitry, the date when the program is expected to be recorded in its entirety; and
   displaying the date on the display device.

7. A system for recording a program and playing back a program on a display device, comprising:
   a recording device for recording programs; and control circuitry configured to:
   store a recording priority for a scheduled recording of a program;
   determine whether the recording priority permits recording an alternate transmission of the program;

in response to determining that the recording priority permits recording an alternate transmission of the program, identify alternate transmissions of the program;

record a portion of a plurality of transmissions to record the entirety of the program, while avoiding resource conflicts; and play back the program from the portion of each transmission that was recorded so that the entirety of the program is played back.

8. The system of claim 7 wherein the control circuitry is further configured to play back each recorded portion sequentially based on the position of each portion within the program.

9. The system of claim 7 wherein the control circuitry is further configured to:

determine, for each identified transmission, whether recording a portion of the identified transmission conflicts with uses of a tuner; and record the portion of a plurality of transmissions that does not conflict with uses of a tuner.

10. The system of claim 7 wherein the control circuitry is further configured to determine, for each identified transmission, whether recording a portion of the identified transmission conflicts with the space available for recording programs; and record the portion of a plurality of transmissions that does not conflict with the space available for recording programs.

11. The system of claim 7 wherein the first recorded portion of the program is from an alternate transmission of the program.

12. The system of claim 7 wherein the control circuitry is further configured to:

determine the date when the program is expected to be recorded in its entirety; and display the date.

* * * * *